Oct. 14, 1952     C. G. PULLIN ET AL     2,613,748
HELICOPTER WITH AUXILIARY ROTOR
Original Filed Dec. 9, 1946     4 Sheets-Sheet 1
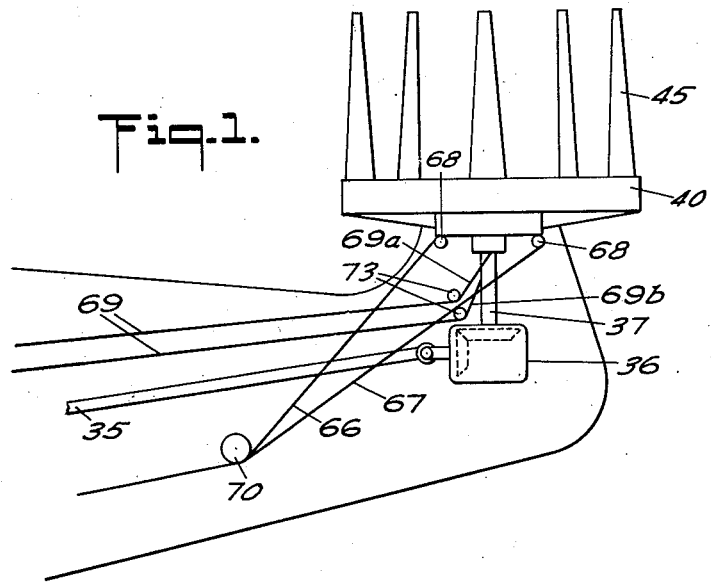
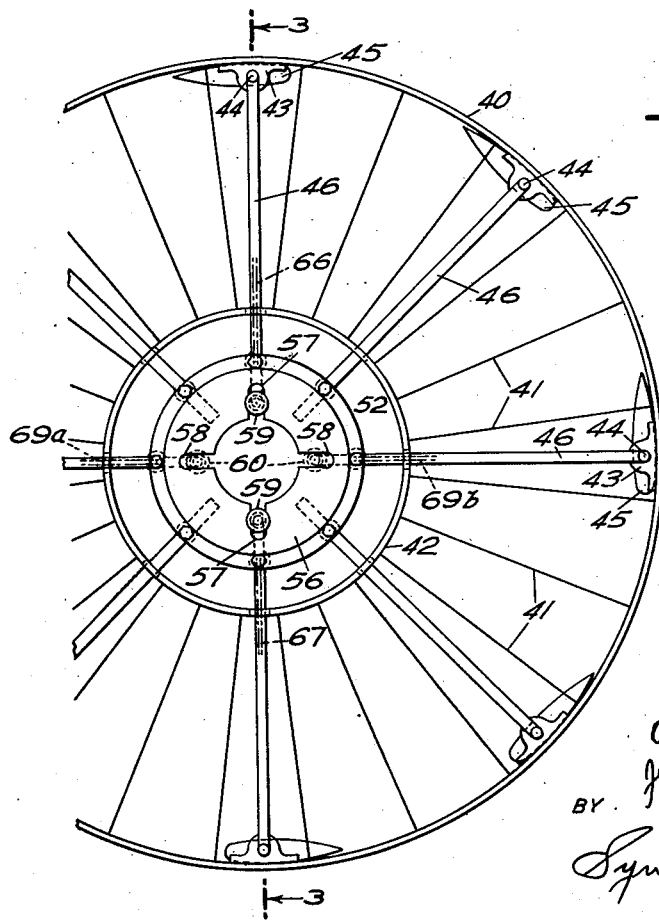
INVENTORS
Cyril G. Pullin
Jacob S. Shapiro
BY
ATTORNEYS Oct. 14, 1952   C. G. PULLIN ET AL   2,613,748
HELICOPTER WITH AUXILIARY ROTOR
Original Filed Dec. 9, 1946   4 Sheets-Sheet 2
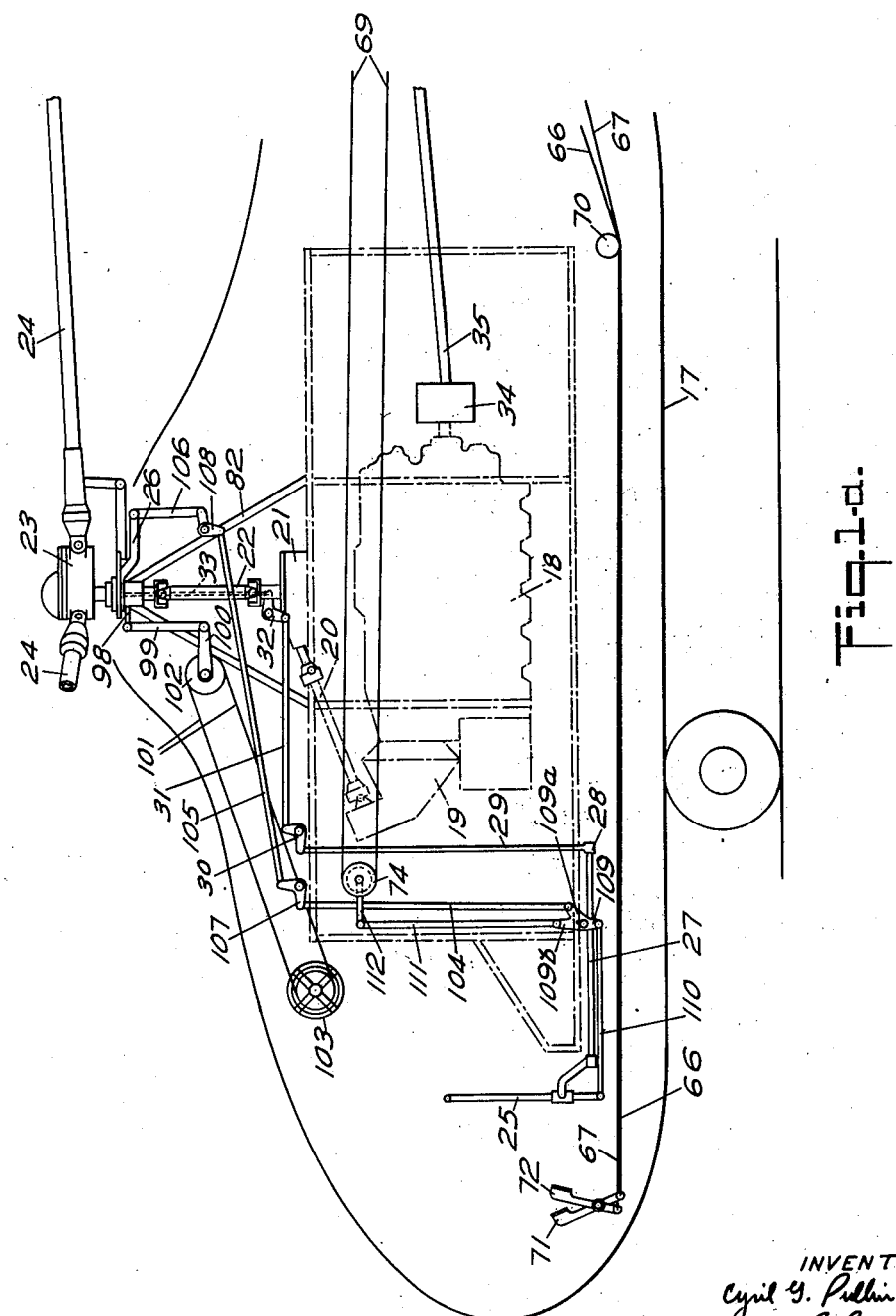
Fig.1.a.
INVENTORS
Cyril G. Pullin
Jacob S. Shapiro
BY
Symmestwad & Lechner
ATTORNEYS

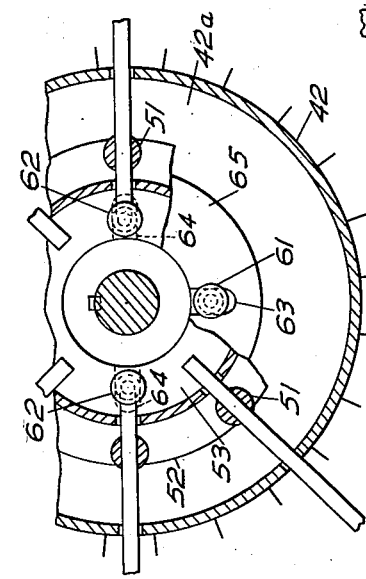
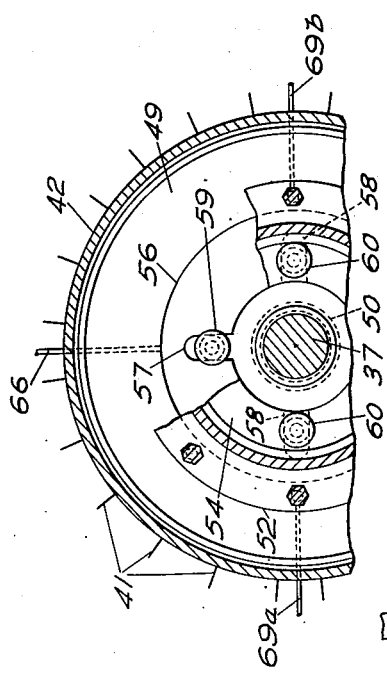
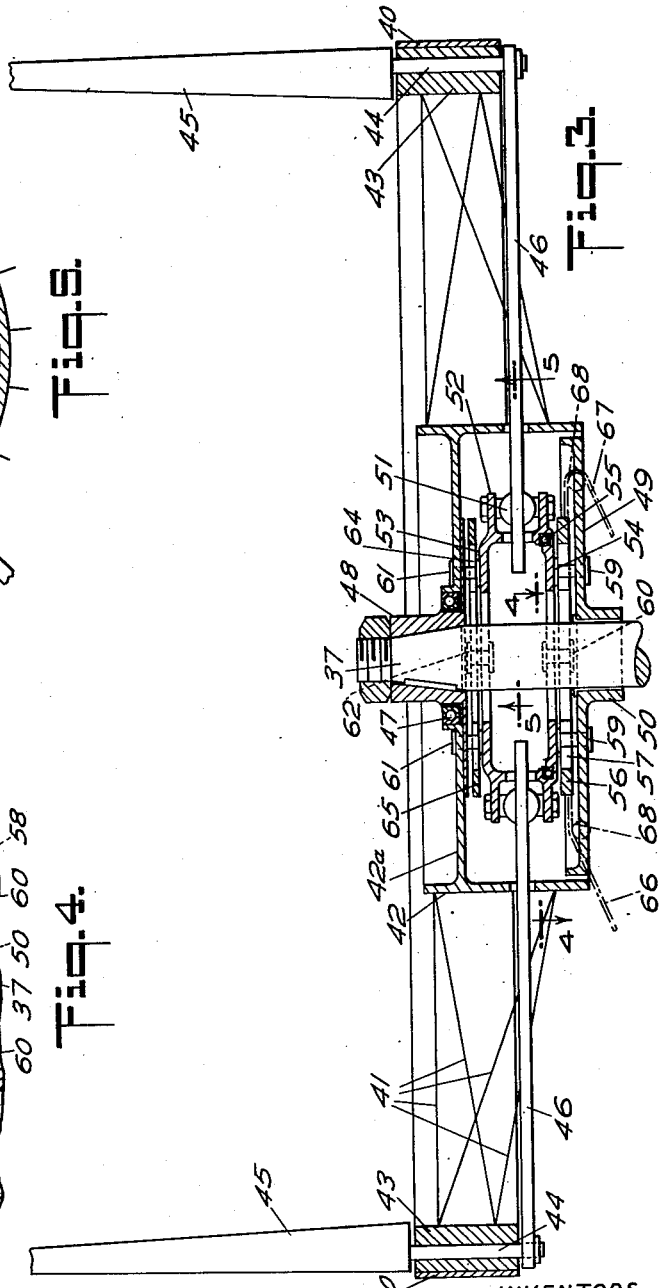

Patented Oct. 14, 1952

2,613,748

UNITED STATES PATENT OFFICE 2,613,748

HELICOPTER WITH AUXILIARY ROTOR

Cyril George Pullin, Tadburn, Ampfield, and Jacob Samuel Shapiro, Hampstead, London, England, assignors, by mesne assignments, to Autogiro Company of America, Philadelphia, Pa., a corporation of Delaware Original application December 9, 1946, Serial No. 714,988. Divided and this application July 29, 1947, Serial No. 764,492. In Great Britain September 27, 1945

Section 1, Public Law 690, August 8, 1946
Patent expires September 27, 1965

3 Claims. (Cl. 170—135.24)

This invention relates to helicopters of the kind provided with an auxiliary rotor producing a horizontal thrust, situated at a distance from the aircraft c. g. on the fore and aft centre line, its thrust being utilized for compensating the torque-reaction of the main lifting rotor system.

This application is a division of application Serial Number 714,988, which was filed in the name of the joint applicants herein on December 9, 1946.

We have found that the overall efficiency of a helicopter of this kind can be improved at the high-speed end of the forward speed range if the auxiliary rotor can be made to contribute substantially to the propulsion of the aircraft and its propulsive thrust is progressively increased as the speed is increased; in the medium and low-speed parts of the speed range the best efficiency is obtained by relying entirely on the main rotor system for propulsion as well as sustentation, the auxiliary rotor being used solely for torque-reaction compensation and yawing control. The transition between the "medium-speed" and "high-speed" parts of the speed range, being the speed at which it becomes advantageous to begin obtaining propulsive thrust from the auxiliary rotor will depend on various design parameters of individual aircraft; it is not in general very critical, but usually lies nearer the upper limit of the design speed range than the lower limit (which is zero).

According to the present invention the auxiliary rotor is of the so-called paddle-wheel type, by which is meant a rotor with aerofoil shaped blades whose spanwise axes lie in planes containing the axis of rotation and are symmetrically spaced around it, the blades being oscillated about their spanwise axes once per revolution of the rotor, and the oscillations of all the blades being identically phased with reference to a datum, fixed with respect to the airframe. Such a rotor will produce a thrust perpendicular to its axis and as used in this invention the axis is substantially vertical so that the thrust is necessarily horizontal.

The invention provides for use of an auxiliary rotor of the character above referred to, together with control means providing for variation of magnitude and direction of the thrust of the auxiliary rotor, whereby the auxiliary rotor may serve not only for control in yaw, for instance for compensating for the torque-reaction of the main lifting rotor system, but may also serve to contribute propulsive effect.

An object of the invention is to provide control means preferably interlocked with other control organs of the aircraft so that when the normal controls are actuated to effect translational flight, propulsive effect is derived from the auxiliary rotor, at least in the upper portion of the speed range.

With the paddle-wheel type of auxiliary rotor, the magnitude and direction of the thrust can be varied by respectively varying the amplitude and phase of the blade oscillation; and since a blade oscillation of any given amplitude and phase may be considered as the resultant of two independent oscillations of differing amplitudes and having a phase difference of 90°, the amplitude and phase of the blade oscillation may be completely controlled by independently controlling the amplitudes of oscillation in two mutually perpendicular phases.

According to a further feature of the invention applicable to a helicopter having an auxiliary rotor of the paddle-wheel type as herein defined, with vertical axis, independent mechanisms are provided for varying the amplitude of the oscillation of the paddle-wheel rotor blades in each of two phases whose maxima (of angular blade displacement from the mean position in either sense) occur respectively in the fore and aft and transverse vertical planes, the mechanism controlling the amplitude in the fore and aft phase being coupled to the pitching control member of the lifting rotor system so that said amplitude is progressively increased as said member is displaced in the "nose-down" direction, and the mechanism controlling the amplitude (of auxiliary rotor blade oscillation) in the transverse phase being operated by an independent control member for controlling the aircraft in yaw.

If the amplitude of blade oscillation in the fore and aft phase is controlled solely by the pitching control member, the said amplitude must increase continuously throughout the full range of travel of the control member, since the amplitude of oscillation in any radial plane of a paddle-wheel rotor for zero thrust in that plane increases with the relative wind in that plane; and if the fore and aft thrust component is to increase progressively with forward speed, when the latter exceeds a prescribed "transition" value, the increase of oscillation amplitude with control member displacement must be progressively greater than is required to maintain zero forward thrust for positions of the control member between an intermediate position corresponding to the "transition" speed and the limiting "nose-down" position.

How the foregoing objects and advantages are attained will appear more clearly from the following description referring to the accompanying drawings, in which—

Figures 1 and 1a together constitute a schematic general arrangement view in side elevation of a helicopter embodying the invention, Figure 1 showing the rear portion and Figure 1a the front portion of the helicopter;

Figure 2 is an end view of the auxiliary rotor;

Figure 3 is a central vertical section of the auxiliary rotor taken along the line 3—3 of Figure 2;

Figure 6:
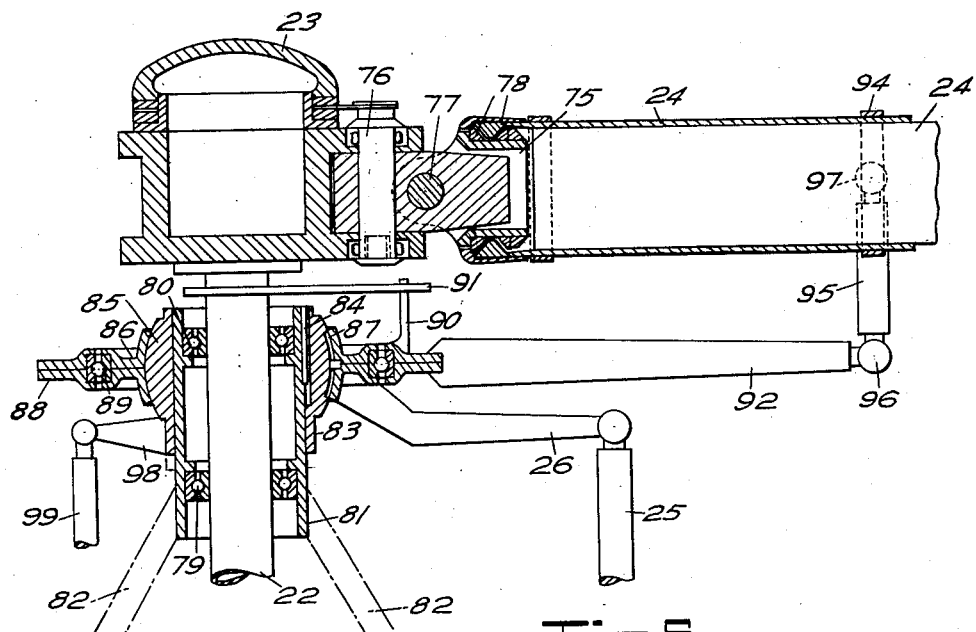
Figure 7:
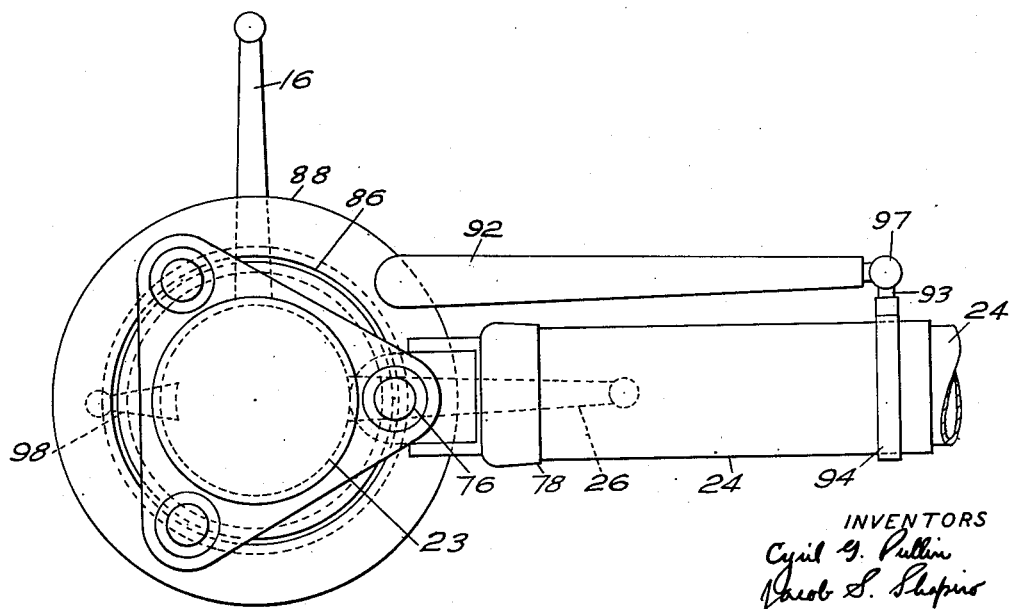

Figures 4 and 5 are partial sections taken respectively along the lines 4—4 and 5—5 of Figure 3;

Figure 6 is a central axial section of the lifting rotor hub and a blade articulation, this view being on an enlarged scale as compared with Figure 1a; and Figure 7 is a plan view of the parts shown in Figure 6, to the same scale.

In Figures 1 and 1a the helicopter has a body 17 enclosing an engine 18, on the front of which is a main gearbox 19, from which a transmission shaft 20 is taken to a lifting-rotor reduction-gear housing 21; and an upright shaft 22 transmits the engine power from the rotor reduction gear to the lifting-rotor hub 23 carrying rotor blades 24.

Pitching displacement of a conventional control column 25 operates a pitching control linkage hereinafter described, connected to a fore-and-aft lever 26 of a swash-plate mechanism for applying so-called cyclic pitch control to the lifting rotor blades. Similarly a rolling control linkage, operated by rolling displacement of the control column and comprising a torque tube 27, crank 28, push-pull rods 29, 31, 33 and bell-cranks 30, 32 is connected to a transverse lever 16 of the swash-plate mechanism (see Figure 7).

On the rear of the engine is an auxiliary gear-and-clutch housing 34 from which a transmission shaft 35 is taken to an auxiliary rotor reduction-gearbox 36; and from this the drive is transmitted to the auxiliary rotor through upright transmission shafting 37.

The auxiliary rotor, whose construction is illustrated in Figures 2 to 5, comprises a blade-supporting wheel consisting of a rim 40 connected by wire spokes 41 to a hub-shell 42; and the rim carries blade-bearing brackets 43 rotatably supporting shafts 44 which are parallel to the axis of the hub-shell and rim, and on which the blades 45 are cantilever-mounted. To each shaft 44 is secured a radial rod 46.

The hub-shell 42 is integrally formed with a hub-disc 42a, whose central boss houses the outer race of a ball-type freewheel coupling 47; and the inner race of this coupling is carried by an internally tapered collar 48 keyed onto the taper-end of shaft 37. The forward end of the hub-shell 42 is closed by a fixed plate 49 formed with a boss 50 having a central opening constituting a steady bearing for the shaft 37.

The rods 46 pass through openings in the hub-shell 42 and slide in ball members 51 which are pivotally supported in flanges 52 integrally formed on an inner shell 53 and extending from it in planes perpendicular to the axis of rotation. The shell 53 has openings to accommodate the ends of rods 46 and the pivotal axes on which the members 51 can turn are parallel to the axis of rotation. The shell 53 rotates with the hub 42, 42a and its forward end is closed by a non-rotary plate 54 on which the shell 53 is located by a bearing 55.

The amplitude and phasing of the oscillations of the blades 45 about their spanwise axes, that is about the axes of their pivotal mountings 44, 43 are varied by displacing the shell 53 in a direction perpendicular to its axis. Such a displacement will cause the rods 46 and the blades 45 to which they are fixed to rock about their pivotal mountings 44, 43, the angular and linear displacements of the rods relatively to the shell 53 being accommodated by the sliding and pivoting joints 51. It can be shown that if the shell 53 is so displaced as to become eccentric with the wheel 40 the rods 46 are displaced in such a way that if prolonged they would all pass through a point eccentrically displaced in the same direction as the centre of the shell 53, the distance of this point from the wheel centre being proportional to the eccentricity of the shell 53; the ratio of these distances is the same as that of the radii of the pivotal connections 44, 43 and 51 respectively, taken from the rotor centre. Such a disposition of the rods 46 brings about, when the rotor rotates, an oscillation of the rotor blades of satisfactory wave-form.

To enable the shell 53 to be displaced eccentrically from the hub 42, 42a, it is connected to the hub plate 42a by an "Oldham" type coupling and a similar coupling connects the non-rotary locating plate 54 with the fixed plate 49. The latter coupling consists of an intermediate plate 56 in which are formed two pairs of slots 57, 58 located on mutually perpendicular diameters (see Figure 2, in which the plate 49 has been removed, and Figure 4). Slots 57 are engaged by pins 59 fixed in plate 49 and slots 58 by pins 60 fixed in the locating plate 54. Similarly the hub plate 42a and the shell 53 carry pairs of pins 61, 62 respectively located on mutually perpendicular diameters and engaging pairs of slots 63, 64 formed in an intermediate plate 65 (see Figure 5).

Fore and aft displacement of the shell 53 is effected by displacing the intermediate plate 56 in the fore and aft direction, the displacement being transmitted by pins 60; for this purpose cables 66, 67, led over jockey-pulleys 68, are secured to the edge of plate 56 at the front and rear respectively. Fore and aft displacement of shell 53, causing a corresponding displacement of the meeting point of rods 46, gives rise to a blade oscillation in the appropriate phase for producing a transverse thrust whose direction is determined by the direction (forwards or rearwards) of the eccentricity of the rod-meeting point and by the direction of rotation of the auxiliary rotor (see Figures 2, 3 and 4).

Similarly transverse displacement of the shell 53 giving a fore and aft thrust component is effected by the cable 69, whose ends 69a, 69b are connected to the edge of the locating plate 54 at port and starboard respectively (see Figures 2 and 4).

The cables 66, 67 are led over jockey pulleys 70 direct to the rudder pedals 71, 72; and the cable 69 is led over jockey pulleys 73 to the pulley 74 (see Figure 1a).

When the locating and intermediate plates 54, 56 and shell 53 are concentric with the auxiliary rotor the latter rotates idly and delivers no thrust provided there is no relative wind perpendicular to the axis. Eccentric displacement of the shell 53 causes the rotor blades to be oscillated about their spanwise axes, once per revolution, with an angular amplitude proportional to the extent of the eccentricity of the shell 53. The phasing of the oscillation is such that the maximum excursions of the blades from their neutral position occur in a plane perpendicular to the eccentricity of the shell 53, and the maximum excursion of the blade leading edge towards the axis of rotation occurs 90° in advance of the direction in which the shell 53 is eccentrically displaced, with reference to the direction of rotation. If there is no relative wind in the plane of the maximum excursions of the blades, the thrust component in this plane acts from the side on which the excursion of the blade leading edge is towards the axis and towards the side where the leading edge excursion is away from the axis. In a relative wind zero thrust is obtained with a blade oscillation such that the leading edge is remote from the axis in the upstream position, the amplitude of the oscillation being proportional to the relative wind velocity. If the amplitude is increased beyond that needed to give zero thrust the thrust acts in the downwind direction. Thus in this example in which the auxiliary rotor is left-handed (as viewed from above) the maximum excursion of the blade leading edges towards the axis occurs on the starboard side of the rotor when the shell 53 is displaced rearwardly; and consequently the thrust is to port. Similarly displacement of the shell 53 forwards causes a thrust to starboard. To maintain zero thrust in the fore and aft direction, the shell 53 must be displaced to port progressively with increasing forward speed, and to obtain propulsive thrust the displacement to port must be further increased.

The elements of the lifting rotor shown in Figures 6 and 7 comprise the driving shaft 22 and the hub 23 on which blade root stubs 75 are articulated by drag pivots 76 and flapping pivots 77; and the blades 24 are supported by the stubs 75 on torsional or blade-pitch-varying bearings 78. The driving shaft 22 is integral with the hub 23 and is supported in bearings 79, 80 by a cylindrical housing 81 secured to a pylon structure 82.

Pitch variation of the rotor blades, both "mean" and "cyclic," is effected by a swash-plate mechanism comprising a collar 83, which slides on the outside of the housing 81, being prevented from rotating by a splined connection 84, and which has a male spherical surface 85 engaged by a corresponding female spherical surface of a non-rotating swash-plate member 86, the latter being prevented from rotating by a pin-and-slot connection 87. The member 86 carries a rotary swash-plate ring 88 on a bearing 89 and the ring 88 is rotated by shaft 22 through a connection conventionally represented by an arm 90 integral with the ring 88 engaged by an arm 91 rigid with the shaft 22. Arms 92 projecting from the ring 88 are connected with arms 93, secured to the blades 24 by straps 94, through links 95 with ball-joints 96, 97 at each end.

Cyclic pitch variation is effected by the arms 26 and 16 connected to the pitching and rolling control circuits respectively, these arms 26 and 16 being rigid with the non-rotary swash-plate member 86.

Variation of the mean rotor-blade-pitch angle is effected by shifting the collar 83 vertically on the cylindrical housing 81, for which purpose the collar 83 is provided with a rigid arm 98 connection through a universal joint with a push-pull rod 99.

The control circuit operating the arm 98 is shown in Figure 1a and comprises the rod 99, a lever 100 connected to rod 99, and an endless cable 101 passing over a pulley 102 fast on the shaft of lever 100 and over a cable drum formed on a handwheel 103.

Referring further to Figure 1a, the pitching control circuit which operates the swash-plate arm 26 for tilting the swash-plate 86, 88 in the pitching plane and thereby applying cyclic pitch control in the pitching plane, comprises push-pull rods 104, 105, 106 and bellcranks 107, 108. This control circuit is connected to one arm 109a of a three-armed bell-crank 109, 109a, 109b, to whose lower arm 109 fore and aft motion of the control column 25 is transmitted by a push-pull rod 110.

The third arm 109b of the bellcrank 109, 109a, 109b is connected by a push-pull rod 111 with a lever 112, which operates the pulley 74. The pulley 74 carries the cable 69, previously mentioned, which operates the variable pitch mechanism of the auxiliary rotor.

The mutual relationship of the crank arms 109, 109a, 109b is such that when the control column is in a rearward position appropriate to hovering the arm 109b is dead-centered and movement of the control column has no effect on the pitch of the auxiliary rotor, but the arm 109a is fully effective in operating the fore and aft cyclic pitch control of the lifting rotor; whereas when the control column is fully forward the arm 109a is dead-centered and the arm 109b fully effective. Therefore as the control column is displaced forwardly, the ratio of swash-plate displacement in the pitching plane to control member displacement progressively decreases and the ratio of auxiliary rotor pitch change to control member displacement increases progressively. The connection to the auxiliary rotor variable pitch mechanism is so made that the auxiliary rotor pitch is coarsened as the control column is displaced forwardly and the control circuits are so proportioned that the auxiliary rotor pitch is coarsened sufficiently as the control column approaches its fully forward position to cause the propulsive thrust of the auxiliary rotor to increase progressively.

It will be noted that the control of the auxiliary rotor in respect to its propulsive function, is effected by the control column 25 and that the propulsive thrust of the auxiliary rotor is thereby coordinated with the pitching control of the lifting rotor, throughout the whole forward speed range; and further that the yawing control system is unusually simple.

We claim:

1. A helicopter having a lifting rotor system with means for controllably displacing the lift vector in the pitching plane of the aircraft and an auxiliary rotor comprising a series of blades with their spanwise axes paralleling the rotational axis of the auxiliary rotor, and with the latter axis positioned substantially vertically and offset from the center of gravity of the aircraft and with its blades mounted for oscillation about their spanwise axes, independent control mechanisms for varying the amplitude of oscillation of the paddle-wheel rotor blades about their span axes in each of two phases whose maxima of angular blade displacement from the mean position in either sense occur respectively in the fore and aft and transverse vertical planes, the mechanism controlling the amplitude in the fore and aft phase being coupled to the pitching control member of the lifting rotor system to effect variation of said last-mentioned amplitude, the coupling connection providing for progressive increase of said last mentioned amplitude as said member is displaced in the "nose-down" direction, and the mechanism controlling the amplitude of blade oscillation in the transverse phase being operated by an independent control member for controlling the aircraft in yaw.

2. A helicopter having a lifting rotor system and having a fight control for the lifting rotor system for effecting translational flight, an auxiliary rotor comprising a series of blades with their spanwise axes paralleling the rotational axis of the auxiliary rotor, and with the latter axis positioned substantially vertically and offset from the center of gravity of the aircraft to provide for control of the aircraft in yaw, and having blades mounted for oscillation about their span-wise axes, control mechanism for varying the amplitude of oscillation of the blades in a fore and aft plane, and means interconnecting said mechanism with the said flight control of the lifting rotor system of the aircraft and said mechanism including interconnections providing for auxiliary rotor blade oscillation in a plane to contribute propulsive thrust when the flight control is adjusted to a position providing for translational flight of the aircraft.

3. A construction according to claim 2 and further including control mechanism for varying the amplitude of oscillation of the auxiliary rotor blades in a transverse plane and a directional control means for the aircraft connected with said mechanism to regulate the oscillation of said blades in said transverse plane.

CYRIL GEORGE PULLIN.
JACOB SAMUEL SHAPIRO.

REFERENCES CITED

The following references are of record in the file of this patent:

UNITED STATES PATENTS

| Number | Name | Date |
|---|---|---|
| 1,681,500 | Schneider | Aug. 21, 1928 |
| 1,870,674 | Ehrhart | Aug. 9, 1932 |
| 2,123,916 | Rohrbach | July 19, 1938 |
| 2,364,096 | Platt | Dec. 5, 1944 |
| 2,364,496 | Vogel | Dec. 5, 1944 |
| 2,385,889 | Skavinsky | Oct. 2, 1945 |